United States Patent
Matasovic

[15] 3,689,733
[45] Sept. 5, 1972

[54] ARC WELDING GUN

[72] Inventor: John L. Matasovic, c/o Horton, Davis, McCaleb & Lucas, Suite 2040, 230 W. Monroe St., Chicago, Ill. 60606

[22] Filed: Sept. 10, 1971

[21] Appl. No.: 179,357

[52] U.S. Cl. .................................. 219/130, 219/136
[51] Int. Cl. ................................................ B23k 9/16
[58] Field of Search ..................... 219/130, 136, 74

[56] References Cited

UNITED STATES PATENTS

| 3,596,049 | 7/1971 | Ogden | 219/130 X |
| 3,610,875 | 10/1971 | Dal Molin | 219/130 |
| 3,629,547 | 12/1971 | Kester et al. | 219/130 |
| 2,444,767 | 7/1948 | Cobeau | 219/75 |

*Primary Examiner*—R. F. Staubly
*Assistant Examiner*—B. A. Reynolds
*Attorney*—James A. Davis et al.

[57] ABSTRACT

Electric arc welding gun having a base secured to a power cable and gas tube, a head portion including a head member, an electrode-contacting tip and an annular nozzle, an intermediate gooseneck portion comprising a rigid curved neck interconnecting the base and head member, an insulating cap integral with the inner end of the head member, a head nut slidable on the insulating cap with its outer end screwed to the nozzle to hold the latter concentric with the tip and a radial flange at its inner end for contact only with the insulating cap to insulate the nozzle and nut from the tip, a tubular handle, a manually operable switch assembly, and a single ring clamp alone securing the switch assembly to the handle and the handle to the base and quickly releasable to permit selective adjustment of the head portion through 360° about the longitudinal axis of the handle to any desired position relative to the switch assembly, the base being interiorly grooved to direct gas from the gas tube to the gooseneck portion and thereby also employ the gas to effect a cooling action.

12 Claims, 3 Drawing Figures

PATENTED SEP 5 1972 3,689,733 ns
3,689,733

ARC WELDING GUN

BACKGROUND OF THE INVENTION

1. Field of the Invention

This invention relates generally to electric arc welding and more particularly to an arc welding gun. The features herein disclosed may be incorporated in metal, inert gas welding (MIG) or continuous, consumable wire-feeding guns; as well as non-gas shielding types, either water-cooled guns or those that are not liquid cooled.

2. Description of the Prior Art

The welding industry long has sought guns of this type that would be light in weight for operator comfort and yet have the design ruggedness to withstand severe temperature changes in operation, resist extremely rough handling, enable quick and simple assembly or disassembly of component parts, and have an minimum number of relatively inexpensive parts.

Up to the time of this invention, other guns on the market have been assembled with screws fastening the switch assembly to the handle, and screws fastening the handle to the neck assembly or body of the gun. It is a well-known fact that under the excessive heat conditions and rough handling conditions to which guns normally are subjected, screws loosen or are lost and the gun becomes inoperative. Indeed, overtightening or constant tightening of screws damages component parts, and screws frequently are lost during replacement of parts which customarily is required frequently. Other serious problems affecting the performance of guns are in the area of the head, nozzle, insulator and tip, wherein the design of the associated parts determines the length of service life and insulates the nozzle from the welding electrical current. While all gas shielding type guns on the market employ some means of insulating the nozzle from the welding current, a common failure inherent in guns has been the destruction of the insulator component because of unsuitable design of head components, and to a lesser degree, the selection of material used in the insulator to resist the high temperatures normally encountered in welding operations. When the insulator fails or "BURNS UP", the electrical welding current "arcs" the nozzle, head, and tip, resulting in all-out failure of the gun and necessitating replacement of the destroyed parts.

SUMMARY OF THE INVENTION

This invention provides a simplified arc welding gun of fewer parts than those of the prior art in which a single clamping member retains a longitudinally extending handle and a manually operable control switch carried by it on the base of a head portion, so that angular adjustments of the head portion through 360° about the longitudinal axis of the handle to any selected position relative to the switch may be quickly and easily made to facilitate use in any desired position or posture, and cooling of the handle is aided by interiorly grooving the base to direct the gas therethrough from the gas supply tube to the neck of the head portion. The plurality of screws heretofore used to hold the head portion or gooseneck assembly, the handle and the switch assembly together have been eliminated and the single clamping means now employed for that purpose may be loosened to permit angular adjustments of the head portion or removal of the switch assembly from the handle without completely removing that clamping means from the gun. At the same time, the simplified construction facilitates removal and replacement of an electrode-contacting tip in the head member and thermal and electrical insulation and accurate concentric mounting of the nozzle relative to the tip by providing an insulating cap on and integral with the head member, a head nut threadedly engaging the nozzle, slidable on the insulating cap and engageable only with the insulating cap and the nozzle, and by a collet nut on the threaded and radially slotted outer end of the head member to readily releasably retain the tip which has a sliding fit in the head member. In addition to the reduced number of parts compared to prior guns and the resulting reduction in manufacturing and maintenance costs as well as convenience and ease of operation, when the present nozzle is screwed into the head nut, a hand tightening is all that is required to insure a gas leak-proof and electrically insulated assembly, with the result that prolonged testing has demonstrated that failures caused by insulator burn-outs and physical deterioration have been eliminated.

IN THE DRAWINGS

DESCRIPTION OF THE PREFERRED EMBODIMENT

Figure 1:
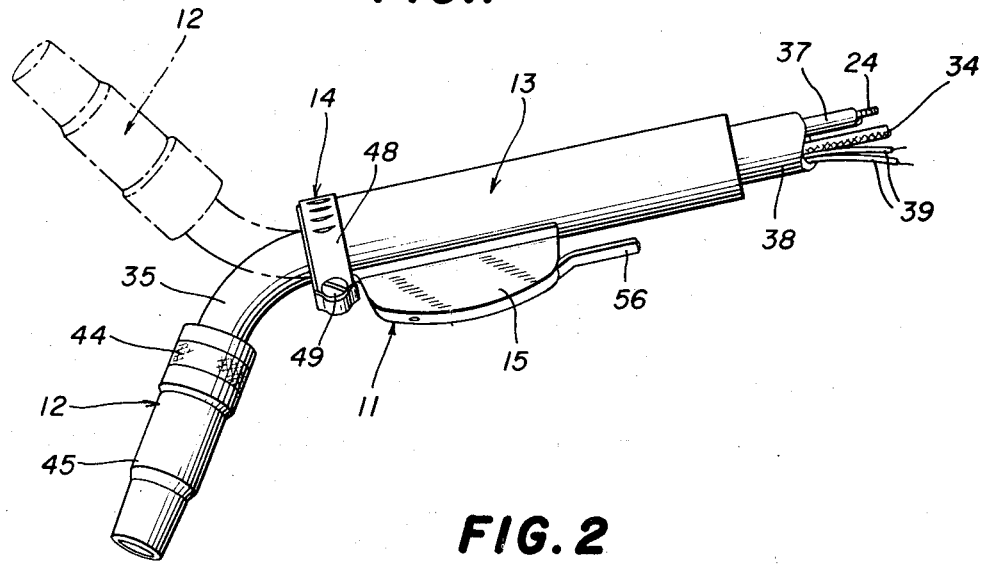
FIG. 1 is a side elevational view showing an electric arc welding gun embodying the features of the invention, with the gooseneck and head portion illustrated in broken lines in a selectively adjustable position.

Referring more particularly to FIG. 1, reference numeral 11 indicates in general an electric arc welding gun made up of a head portion indicated generally by the reference numeral 12, a handle portion generally indicated at 13, and a single clamping means indicated generally by reference numeral 14 for securing the head portion 12, handle portion 13 and a switch housing 15 together.

Figure 2:
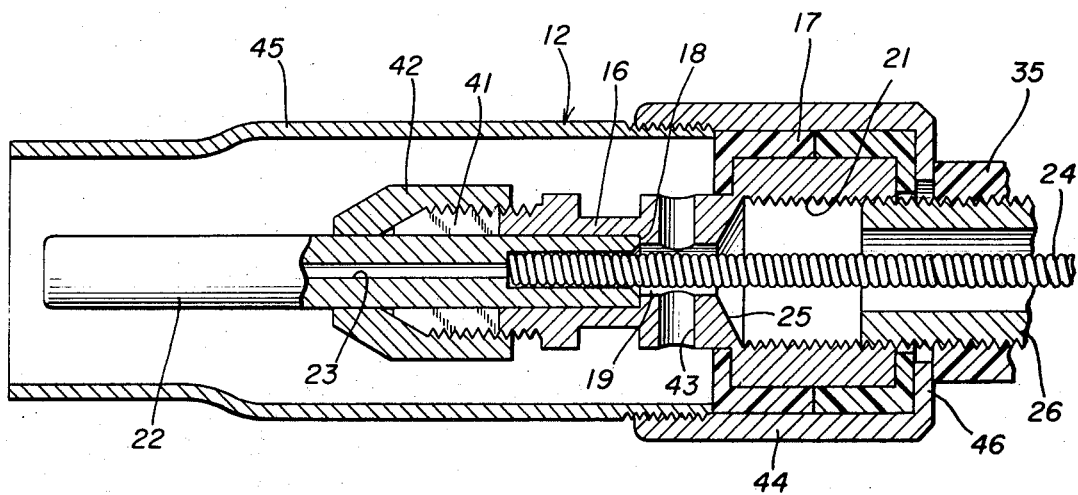
FIG. 2 is a longitudinal sectional view through the head portion of the gun.

As best seen in FIG. 2, the head portion 12 comprises a head member 16 with an enlarged inner end having an insulating cap or flanged ring 17 mounted on and secured thereto. This insulating cap 17 is made of an aromatic polyimide supplied by E. I. de Pont de nemours & Co., Inc. under the trademark VESPEL which is an excellent electrical and thermal insulator. The head member 16 is tubular with a bore extending throughout its length, an outer end portion of the bore terminating at its inner end in a shoulder 18 to define an intermediate portion 19, while the inner end of the bore of head member 16 is counterbored and tapped at 21. The shoulder 18 in the bore of the head member 16 limits inner movement of a separate or replaceable electrode-contacting tip 22 which, in turn, has a small bore 23 for receiving, guiding and electrically contacting the end portion of the electrode or welding rod or wire thus fed longitudinally therethrough.

The inner end of the bore 23 of the tip 22 is counterbored to receive and center the end of the wire-carrying liner 24, which preferably is a flexibly wound hollow cable. The inner end of the countersunk and tapped portion 21 of the bore of head member 16 provides a slanting shoulder 25 which assists in guiding the outer end of the line 24 into its final assembled position of FIG. 2 when the parts of the head portion are being screwed together.

The tapped inner end portion 21 of the head member 16 is screwed onto the threaded outer end of a curved rigid tube 26 which comprises a gooseneck screwed adjacent its inner end to a nut 27 (FIG. 3) which is secured, as by brazing, to the inner face of a base in the form of a hollow cylinder 28 mounted on the neck tube 26 and having its outer face similarly secured thereto, as by brazing, so as to insure a leakproof connection with the neck tube.

Figure 3:
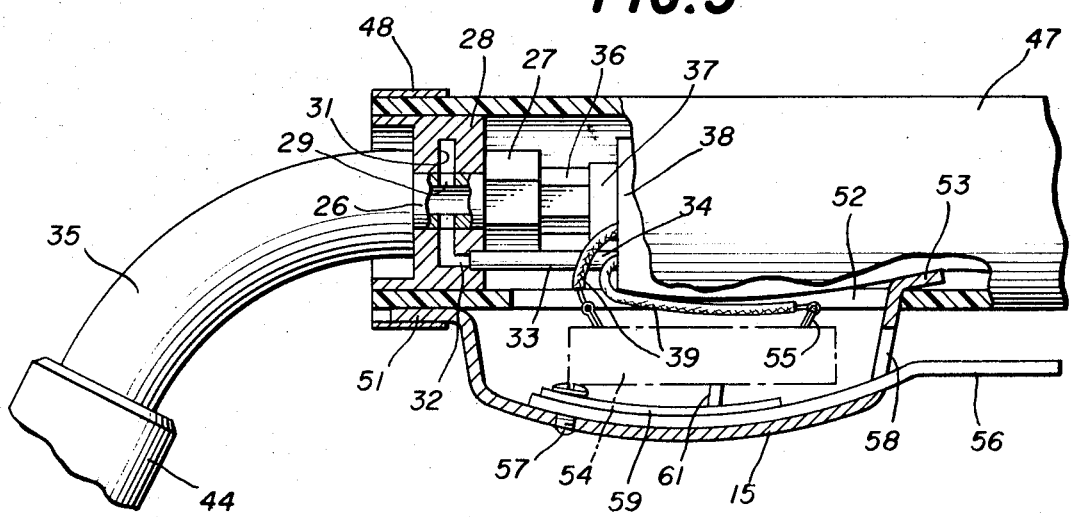
FIG. 3 is a side elevation of the gooseneck and handle portions of the gun, with parts broken away about the base and portions of the handle shown in longitudinal section.

The inner end portion of the gooseneck tube 26, as shown in FIG. 3, is provided with two opposed radial apertures 29 interconnecting its bore with an inner peripheral groove 31 in the base 28. At one point, this inner groove 31 communicates with an axially disposed steeped aperture 32 extending outwardly and through the inner face of the base 28 and receiving the forward end of a small tube 33 suitably connected to, and extending rearwardly from, the base. This tube 33 engages in, and is secured to, the outer end of a flexible gas hose 34 of known construction. The exposed portion of the rigid curved tube 26 is protected by a flexible insulating sleeve 35, and the members 26 and 35 comprise a gooseneck portion of the gun supporting the head member 16 and tip 22 at its outer end from the cylinder or base 28.

The inner end of the gooseneck tube 26 receives an outer nut 36 forming a part of a fitting connected to the outer end of the usual power cable 37 (FIG. 1) through which the flexible wire-carrying liner 24 extends. A flexible tubular jacket 38 of known construction, and preferably made of neoprene, houses and protects the gas hose 34, power cable 37 and a pair of electrical control wires 39.

Referring to the illustration in FIG. 2 of the head portion 12 of the gun, the outer end of the head member 16 is externally threaded and has a plurality of circumferentially spaced and inwardly extending slots 41 to provide a collet for slidably receiving contact tip 22 and cooperating with a nut 42 to removably retain it in the head 16. Gas discharging outlets which comprise radial apertures 43 extend through the head member 16 slightly forwardly or outwardly of the flange on the insulating cap 17. A head nut 44 is slidably mounted on the insulating cap or ring 17 which is tapped at its outer end to receive the threaded inner end of a tubular nozzle 45 and has a flange 46 formed at its inner end. This end flange 46 on head nut 44 contacts only the inner end or flange of insulating cap 17 and the end of the insulating sleeve 35 so as to electrically insulate head nut 44 and nozzle 45 from the rest of the head portion 12 of the gun. It will be appreciated that the insulating cap 17 preferably is made of two separate rings pressed or molded onto the inner end of head member 16 to become integral therewith. When assembled, screwing of the head member 16 onto the outer end of the neck tube 26 forces flange 46 of the head nut 44 into firm contact with the outer end of the insulating sleeve 35, and screwing of the nozzle 45 into the head nut 44 forces the inner end of the insulating cap 14 into firm contact with the head nut flange 46. At the same time, the close fit of the insulating cap 17 into the head nut 44 and the length axially of the head of the cap 17 insures proper concentric positioning of the contact tip 22 and the nozzle 45.

It will be appreciated, of course, that other shapes of nozzles than that herein illustrated, such as tapered screw extended, similarly may be employed, and that threaded screw tips may be used, if desired, instead of the plain cylindrical slip tip 22. It also will be appreciated that when assembled for use as shown in the drawings, gas discharging from the neck tube 26 (FIG. 2) will pass through the annular space within the bore of the head member 16 surrounding the liner 24 and be discharged therefrom through the radial apertures 43 into the gas nozzle 45 and, as required in such an arc welding gun, it will be directed from the outer open end of the nozzle as a protective shield surrounding the wire or electrode-discharging tip 22 and the electrode fed therefrom.

Referring again to FIG. 3, the gas is supplied to the gooseneck tube 26 from the gas hose 34 by means of the small tube 33, the axially disposed aperture 32 and inner peripheral groove 31 in the base 28 and, therefrom, through the two oppositely disposed radial apertures 29 into the bore of the tube. This not only facilitates delivery of the gas from the hose 34 to the head portion 12, but also assures a cooling action with respect to the handle 13 by virtue of such gas flowing through the supporting base 28.

The handle portion 13 comprises a rigid tube 47 of suitable insulating material which loosely surrounds the tubular jacket 38 and slidably fits at its outer end around and onto the base member 28. To facilitate securing of this handle tube 47 to the base member 28, the outer peripheral surface of the latter preferably is knurled or otherwise roughened, and the outer end of tube 47 is slotted. The clamping means 14 in the preferred embodiment herein illustrated comprises a flexible split ring or band 48 having its separated ends secured together by a clamping screw 49. In addition to clamping the outer end of the handle tube 47 onto the base member 28, the band 48 of the clamping means 14 also engages a flange 51 formed on the base portion of the switch housing 15 (FIG. 3) adjacent the outer end of the handle. The handle tube 47 is provided with a longitudinally extending slot or aperture 52 to accommodate and cooperate at its inner end with a tang 53 struck from, or formed as an inwardly extending portion of, the switch housing 15. With this arrangement, simple loosening of the clamping screw 49 permits rotative movement of the head portion 12 of the gun relative to, and about, the longitudinal axis of the handle tube 47. This enables selective angular adjustment of the head portion 12 relative to the handle portion 13 and its switch means 15 through 360°, if desired, which greatly facilitates use of the welding gun in different positions or postures while enabling the operator to maintain normal hand contact with the handle portion 13 and the switch means carried thereby. Further loosening of the clamping screw 49 enables ready removal of the band 48 and this permits the switch housing 15 to be moved outwardly away from the handle tube 47 and completely separated therefrom, if desired, by sliding tang 53 outwardly through the handle aperture 52.

It will be understood that the housing 15 contains a suitable microswitch 54 of well-known construction, and the ends of the control wires 39 are provided with terminal members 55 (FIG. 3) which slidably frictionally engage and are retained by the terminals of the switch 54. A switch closing member 56 is pivotally secured at its inner end to the switch housing 15 by a screw or rivet 57 and extends rearwardly through a slot 58 in the housing for manual actuation by the operator of the gun, a suitable spring member 59 carried by this switch closing member 56 being adapted to actuate the switch control pin 61 when the rear end of the member 56 is pressed toward the handle tube 47.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an electric arc welding gun supplied by a flexible power cable including a wire-carrying liner for receiving and guiding a mechanically fed consumable electrode, a gas tube and a flexible tubular jacket housing said cable and tube; a base secured to said cable and said tube; a head portion including a head member, an electrode-contacting tip and an annular nozzle surrounding said tip; an intermediate gooseneck portion comprising a rigid curved neck secured to said base and said head member; a longitudinally extending handle, and a single clamping means removably securing said handle to said base to permit selective angular adjustment of said gooseneck portion and base relative to the longitudinal axis of said handle.

2. An arc welding gun according to claim 1, wherein said handle is tubular with peripherally spaced slots therethrough at one end, said base is cylindrical and fits slidably into the slotted end of said handle, and said clamping means comprises a ring clamp for squeezing the slotted end of said handle into gripping engagement with said base.

3. In an arc welding gun according to claim 1, a pair of control wires housed by said tubular jacket, and a manually operable switch assembly mounted on said handle and electrically connected to said control wires, whereby said head portion may be selectively adjusted through 360° about the longitudinal axis of said handle to any desired position relative to said switch assembly.

4. An arc welding gun according to claim 3, wherein said switch assembly is secured to said handle by said clamping means.

5. In an arc welding gun according to claim 2, a manually operable control switch assembly mounted on said handle for movement therewith relative to said base and said head portion.

6. An arc welding gun according to claim 5, wherein said switch assembly includes an inwardly and longitudinally extending tang at its rear end and a longitudinally extending flange at its front end, and said handle is provided with a slot for receiving said tang and said ring clamp engages over said front flange to removably retain saID switch assembly on said handle.

7. An arc welding gun according to claim 1, wherein said tip is bored to slidably receive an electrode and counterbored at its inner end to receive the outer end of said liner, and means for removably securing said tip to said head member.

8. An arc welding gun according to claim 7, wherein said head member is bored to slidably receive said tip, threaded on its outer surface adjacent its outer end and provided with peripherally spaced slots in said outer end, and said last-recited means comprises a collet nut engaging the threaded outer surface of said head member.

9. In an arc welding gun according to claim 1, wherein said head member is tapped at its inner end to threadedly receive the outer end of said neck, an insulating cap mounted on the inner end of said head member, and a head nut slidably mounted on said insulating cap, the inner end of said nozzle being threaded for engagement by said head nut.

10. An arc welding gun according to claim 9, wherein said head nut is provided at its inner end with a radial flange against which the inner end of said head member is held by screwing said nozzle into said nut.

11. An arc welding gun according to claim 9, wherein said insulating cap comprises a permanent part of said head member and extends longitudinally thereof a distance sufficient to insure concentric spacing between said tip and said nozzle.

12. An arc welding gun according to claim 1, wherein said base is interiorly grooved to interconnect said gas tube and the interior of said neck, whereby gas flowing therethrough effects a cooling action with respect to said handle.

* * * * *

UNITED STATES PATENT OFFICE

CERTIFICATE OF CORRECTION

Patent No. 3,689,733                    Dated September 5, 1972

Inventor(s)  John L. Matasovic

It is certified that error appears in the above-identified patent and that said Letters Patent are hereby corrected as shown below:

Col. 1, ln. 19, change "an" to --a--; ln. 45, change "BURNS UP" to --burns up--.
Col. 2, ln. 11, insert --using-- between 'by' and 'a'.
Col. 3, ln. 25, change "steeped" to --stepped--.
Col. 4, lns. 10 & 11, change "top screw extended" to --tapered or extended--.
Col. 5, ln. 29, insert a hyphen between 'mechanically' and 'fed'.
Col. 6, ln. 17, change "saID" to --said--.

Signed and sealed 23rd day of January 1973.

(SEAL)
Attest:

EDWARD M. FLETCHER, JR.
Attesting Officer

ROBERT GOTTSCHALK
Commissioner of Patents